United States Patent Office 3,758,460
Patented Sept. 11, 1973

3,758,460
STYRYL COMPOUNDS
Josef Schroeder, Leverkusen, and Carl-Wolfgang Schellhammer, Opladen, Germany, assignors to Bayer Aktiengesellschaft, Leverkusen, Germany
No Drawing. Filed Oct. 22, 1970, Ser. No. 83,241
Claims priority, application Germany, Nov. 3, 1969,
P 19 55 068.6
Int. Cl. C07d 55/04
U.S. Cl. 260—240 D                    6 Claims

ABSTRACT OF THE DISCLOSURE 2-styryl-compounds of the formula

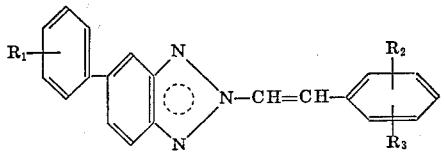

in which $R_1$ denotes hydrogen, halogen, alkyl and alkoxy; and $R_2$ and $R_3$, independently of one another, stand for hydrogen, halogen, alkyl, alkoxy, aryl, aryloxy, aralkyl, aralkoxy, amino, acylamino, cyano, carboxy, alkoxycarbonyl, carbamoyl, sulpho, sulphamoyl, sulphonyl, or for optionally substituted pyrazole and triazole radicals, as well as their preparation and their use as optical brightening agents.

---

The subject matter of the present invention comprises 2-styryl-5-phenyl-benzotriazoles of the general formula

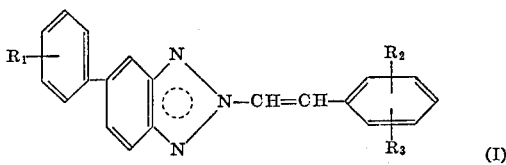

in which $R_1$ denotes hydrogen, halogen, alkyl and alkoxy; and $R_2$ and $R_3$, independently of one another, stand for hydrogen, halogen, alkyl, alkoxy, aryl, aryloxy, aralkyl, aralkoxy, amino, acylamino, cyano, carboxy, alkoxycarbonyl, carbamoyl, sulpho, sulphamoyl, sulphonyl or for optionally substituted pyrazole and triazole radicals, as well as the production thereof and their use as optical brightening agents.

(The circular symbol in Formula I and the following formulae represents the various mesomeric forms of the benzotriazole radical.)

Brightening agents which are particularly suitable are those of the formula

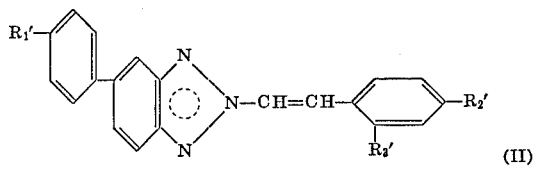

in which $R_1'$ denotes hydrogen, chlorine, alkyl radicals with 1 to 4 carbon atoms and alkoxy radicals with 1 to 4 carbon atoms; $R_2'$ stands for hydrogen, chlorine, alkyl and alkoxy radicals with 1 to 4 carbon atoms, phenyl, phenoxy, amino, acetamino, cyano, carboxy, carbamoyl, sulpho, sulphamoyl, pyrazolyl-1, 1,2,3-triazolyl-1, 1,2,4-triazolyl-1, 1,2,3-triazolyl-2 groups; and $R_3'$ stands for hydrogen, chlorine, sulpho, cyano or for alkyl groups with 1 to 4 carbon atoms.

The new compounds of the Formula I are obtained by reacting 5-phenyl-benzotriazolyl-2-acetic acids of the general formula

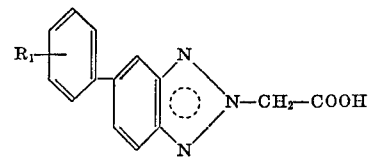

in which $R_1$ has the same meaning as above, with aromatic aldehydes of the general formula

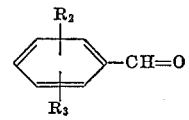

in which $R_2$ and $R_3$ have the same meaning as above, in the presence of suitable condensation agents.

The condensation may be carried out in the absence or presence of an organic solvent. However, a reaction in solvents is preferred.

Suitable solvents are dimethyl formamide, xylene, chlorobenzene, o-dichlorobenzene and the like.

Suitable condensation catalysts are secondary aliphatic amines, such as diethylamine, morpholine and piperidine.

The reaction temperatures may be varied within a fairly wide range; in general, the process is carried out at between 100° and 200° C., preferably at between 130° and 170° C.

Some of the aromatic aldehydes (IV) to be used according to the invention are known. The p-[-triazolyl]-benzaldehydes which have not yet been described are expediently obtained by oxidation of the corresponding toluenes with chromium trioxide/glacial acetic acid/acetic acid anhydride.

The following aldehydes (IV) are particularly preferred:

benzaldehyde,
p-methyl-benzaldehyde,
p-methoxy-benzaldehyde,
p-phenoxy-benzaldehyde,
p-chloro-benzaldehyde,
o-chloro-benzaldehyde,
p-cyano-benzaldehyde,
p-carboxy-benzaldehyde,
p-acetamino-benzaldehyde,
p-sulpho-benzaldehyde,
p-amino-o-sulpho-benzaldehyde,
o-sulpho-benzaldehyde,
p-phenyl-benzaldehyde,
α-naphthaldehyde,
β-naphthaldehyde,
p-[1,2,3-triazolyl-1-]-benzaldehyde,
p-[1,2,3-triazolyl-2-]-benzaldehyde,
p-[1,2,4-triazolyl-1-]-benzaldehyde,
p-[1,2,4-triazolyl-4-]-benzaldehyde,
p-pyrazolyl-benzaldehyde.

The 5-phenyl-benzotriazolyl-2-acetic acids (III) to be used as starting material for the production of the new compounds have not been described. They are obtained by a known method [A. 515, 113 (1935)], by reacting the corresponding triazoles with sodium chloroacetate.

Benzotriazolyl-acetic acids (III) which are particularly suitable are 5-phenyl-benzotriazolyl-2-acetic acid, (4′- methyl-phenyl)-benzotriazolyl-2-acetic acid, (4'-methoxyphenyl)-benzotriazolyl-2 - acetic acid and (4' - chlorophenyl)-benzotriazolyl-2-acetic acid.

In some cases it is advisable to prepare the new Compounds I by reacting the benzotriazolyl-acetic acids of the Formula III, in which $R_1$ has the same meaning as above, with aldehydes of the Formula IV, in which $R_2$ and $R_3$ stand for simple functional groups, such as amino, carboxyl and sulpho, which can be converted into complicated substituents in a simple reaction when the condensation of (III) with (IV) is completed.

For example, carboxyl and sulpho groups are converted in this way into ester and amide groups.

An acylamino group can be converted in known manner into the free amino group and this, in its turn, can be converted into the hydrazino group, and the latter into pyrazole and triazole groups. Furthermore, the amino group can be quaternised, acylated in different ways and diazotised. The diazo compounds can be coupled with suitable aromatic amines and the o-aminoazo dyestuffs so obtained converted into the benzotriazolyl-2 group by oxidative cyclisation.

The new Compounds I are suitable for the optical brightening of various organic materials and are characterised by their very good fastness to light and their good stability to chemical agents, e.g. bleaching agents. The organic materials comprise:

Synthetic organic high-molecular materials, for example, polymerisation products based on organic compounds containing at least one polymerisable carbon-carbon double bond and on the conversion products thereof, such as cross-linking, graft or decomposition products; extended polymers etc., such as polymers derived from $\alpha,\beta$-unsaturated carboxylic acids and their derivatives, from olefinehydrocarbons; polymers derived from vinyl and vinylidene compounds, on halogenated hydrocarbons; polymerisation products which can be obtained by ring cleavage, such as polyamides of the polycaprolactam type; formaldehyde polymers or polymers which can be obtained by polyaddition as well as polycondensation, such as polyether, polythioethers, polyacetals, thioplasts; polycondensation products or precondensates derived from bi- or polyfunctional compounds with condensable groups, their homo- and cocondensation products, such as e.g. saturated compounds (e.g. polyethylene terephthalates) or unsaturated compounds (such as maleic acid-dialcohol-polycondensates and their cross-linking products with copolymerisable vinyl monomers), polyesters, polyamides (e.g. hexamethylene-diamine adipate), maleinate resins, melamine resins, phenol resin (novolakes), analine resins, furan resin, carbamide resins or also the precondensates thereof and products of analogous structure; polycarbonates, silicone resins, and the like; polyaddition products such as polyurethanes, epoxide resins; furthermore, semi-synthetic organic materials, such as cellulose esters or mixed esters (acetate, propionate), nitro-cellulose, cellulose ethers, regenerated cellulose and its after-treatment products, casein synthetic materials; and also natural organic materials of animal or vegetable origin, for example, those based on cellulose or proteins, such as wool, cotton or silk.

The organic materials concerned may be present in various states of processing and aggregate, for example, as blocks, plates, chips, granules, films, foils, lacquers, ribbons, coatings, impregnations, or as filaments, fibres, loose material. On the other hand, the aforesaid materials may also be present in an non-formed state or in various homogeneous or inhomogeneous forms of division and states of aggregate, for example, as powders, solutions, emulsions, dispersions.

Fibre materials, for example, may be present as endless filaments, staple fibres, loose material, skeins, textile fibres, yarns, fibre fleeces or as textile fabrics or textile bonded materials, knitted fabrics and also as papers, cardboards or paper pulps.

The brightening of textile materials is preferably carried out in an aqueous medium from a solution or dispersion. Dispersing agents may be added, such as soaps, polyglycol ethers of fatty alcohols, fatty amines or alkylphenols, cellulose sulphite waste liquor or condensation products of optionally alkylated naphthalene-sulphonic acids with formaldehyde. The brightening may be carried out from a neutral, weakly alkaline or acidic bath, optionally at elevated tempeartures. The brightening agents may also be applied from solutions in organic solvents.

The new optical brightening agents may also be added to or incorporated with the materials before or during moulding. For example, they may be added to the pressure moulding mass or injection moulding mass in the production of films, foils, ribbons or moulded bodies, or they may be dissolved or dispersed in the spinning solution before spinning. The optical brightening agents may also be added to the starting materials, reaction mixtures or intermediate products in the production of fully synthetic or semi-synthetic organic materials, i.e. also before or during the chemical reaction, for example, a polycondensation, polymerisation or polyaddition.

The new brightening agents are characterised by a particularly good fastness to light and chlorite.

The amount of the new optical brightening agents to be used according to the invention, referred to the material to be optically brightened, may vary within wide limits. In general, amounts of between 0.01 and 0.2 percent by weight are used.

(1) EXAMPLES OF PREPARATION

General instruction (A) 0.1 mol of a 5-phenyl-benzotriazole-2-acetic acid (III), 0.11 mol of an aldehyde (IV) and 0.1 mol piperidine are heated at 170–175° C. for 2–5 hours while distilling off the volatile components. After cooling, the crystal mass is reprecipitated from a suitable solvent, for example, chlorobenzene, dimethyl formamide, ethylene glycol monomethyl ether. There are obtained colourless to slightly yellowish, well crystallising compounds.

(B) 0.1 mol 5-phenyl-benzotriazole-2-acetic acid, 0.11 mol aldehyde and 0.1 mol piperidine are heated in 50–200 ml. dimethyl formamide at 150° C. for 4–10 hours. After cooling, the condensation products are filtered off with suction and reprecipitated from a suitable solvent. The following compounds were prepared, for example:

| Compound | M.P. | Process |
| --- | --- | --- |
| 2-styryl-5-phenylbenzotriazole | 148° (ethanol) | A, A |
| 2-(4'-methylstyryl)-5-phenylbenzotriazole | 161° (methyl glycol) | A |
| 2-(4'-chlorostyryl)-5-phenylbenzotriazole | 199–200° (n-butanol) | A |
| 2-(4'-phenoxystyryl)-5-phenylbenzotriazole | 150° (methyl glycol) | A |
| 2-(4'-methoxystyryl)-5-phenylbenzotriazole | 173.5° (methyl glycol) | A |
| 2-(4'-acetaminostyryl)-5-phenylbenzotriazole | 241–2° (methyl glycol) | A, B |
| 2-[4'-(1'', 2'', 3''-triazolyl-2'')-styryl]-5-phenylbenzotriazole | 248° (methyl glycol) | A, B |
| 2-[4'-(1'',2'',3''-triazolyl-1'')styryl]-5-phenylbenzotriazole | 250° (methyl glycol) | A, B |
| 2-[4'-(1'',2'',4''-triazolyl-1'')styryl]-5-phenylbenzotriazole | 234° (methyl glycol) | A |
| 2-(4'-phenylstyryl)-5-phenylbenzotriazole | 209–10° (DMF) | A,B |
| 2-(4'-carboxystyryl)-5-phenylbenzotriazole | 290–8° (DMF) | B |
| 2-(4'-cyanostyryl)-5-phenylbenzotriazole | 198° (DMF) | B |
| 2-(4'-sulphostyryl)-5-phenylbenzotriazole | No characteristic melting points | B |
| 2-(2'-sulphostyryl)-5-phenylbenzotriazole | do | B |
| 2-(naphthostyryl-1')-5-phenylbenzotriazole | 130° (DMF) | B |
| 2-[4'-(tetrahydroindazolyl-1'')styryl]-5-phenylbenzotriazole | 246° (DMF) | B |

(2) EXAMPLES OF APPLICATION

Example (a)

A polyester yarn, prepared from terephthalic acid and ethylene glycol, is kept in a liquor ratio of 1:40 for 45 minutes at 90° C. in a bath containing, per litre, about 0.03 g. 2-[4'-(1",2",3"-triazolyl)-2"-styryl] - 5 - phenyl-benzotriazole. The bath also contains 2 g. sodium chlorite per litre. After rinsing and drying, the yarn exhibits an excellent white tone with a greenish tint.

Example (b)

A polyester fabric, prepared from polyester fibres of terephthalic acid and ethylene glycol, is padded with a dispersion of 1 g. 2-[4'-phenylstyryl]-5-phenyl-benzotriazole per litre, squeezed to a weight increase of about 100%, and thermofixed at 190° C. for 30 seconds. The fabric exhibits a clear brightening effect with a greenish tint.

Example (c)

A polyamide fabric of poly-ε-aminocaprolactam is treated in a liquor ratio of 1:40 with 0.2 g. 2-[4'-sulphamoylstyryl]-5-phenyl-benzotriazole at 80–90° C. The fabric thus brightened is stable to treatment with reducing and oxidising agents.

The brightening agent was obtained from the sodium salt of 2-[4'-sulphostyryl] - 5 - phenyl-benzotriazole by treatment with $PCl_5$ and subsequent treatment with ammonia. M.P. 266° C. (from methyl glycol).

Example (d)

1 kg. of soap flakes are mixed with 1 g. 2-[2'-sulphostyryl]-5-phenyl-benzotriazole and worked into bar soap. The soap exhibits a strong brightening effect in daylight.

Example (e)

A yarn of polypropylene is boiled in a liquor ratio of 1:40 for 30 minutes with 0.03 g. 2-[4'-ethoxycarbonylstyryl]-5-phenyl-benzotriazole per litre. After rinsing and drying, the yarn exhibits an excellent somewhat greenish brightening effect.

The brightening agent is obtained by converting 2-[4'-carboxystyryl]-5-phenyl-benzotriazole with thionyl chloride into the acid chloride and reacting the acid chloride with ethanol. M.P. 157° C. (from ethanol).

What is claimed is:

1. 2-styryl-5-phenyl-benzotriazole of the formula:

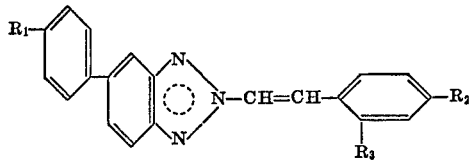

in which $R_1$ denotes hydrogen, chlorine, alkyl with 1 to 4 carbon atoms or alkoxy with 1 to 4 carbon atoms; $R_2$ stands for hydrogen, chlorine, alkyl with 1 to 4 carbon atoms, alkoxy with 1 to 4 carbon atoms, phenyl, phenoxy, amino, cyano, carboxy, carbonyl, sulpho, sulphamoyl, pyrazolyl-1, 1,2,3-triazolyl-1, 1,2,4-triazolyl-1 or 1,2,3-triazolyl-2; and $R_3$ stands for hydrogen, chlorine, sulpho, cyano, or alkyl with 1 to 4 carbon atoms.

2. The 2-styryl-5-phenyl-benzotriazole of the formula:

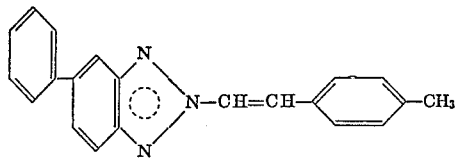

3. The 2-styryl-5-phenyl-benzotriazole of the formula:

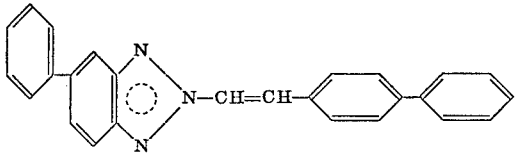

4. The 2-styryl-5-phenylbenzotriazole of the formula:

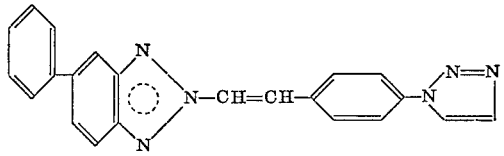

5. The 2-styryl-5-phenylbenzotriazole of the formula:

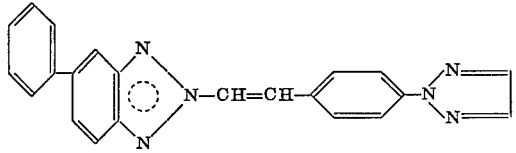

6. The 2-styryl-5-phenylbenzotriazole of the formula:

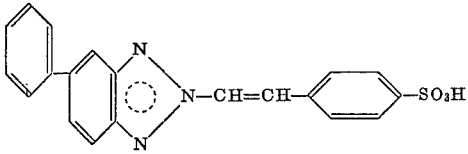

References Cited

UNITED STATES PATENTS

| | | | |
|---|---|---|---|
| 3,427,307 | 2/1969 | Schinzel et al. | 260—240 D |
| 3,505,318 | 4/1970 | Schellhammer et al. | 260—240 D |
| 3,595,859 | 7/1971 | Schellhammer et al. | 260—240 B |
| 3,609,160 | 9/1971 | Meyer et al. | 260—308 B |

FOREIGN PATENTS

| | | | |
|---|---|---|---|
| 1,560,056 | 2/1969 | France | 260—240 D |

OTHER REFERENCES

Schellhammer et al., III Tetrahedron, vol. 26, pp. 497–510 (1970) (unavailable in P.O. Sci. Library, relied upon as abstracted in Chemical Abstracts vol. 72, p. 389, abstract No. 90,377s (1970).

JOHN D. RANDOLPH, Primary Examiner

U.S. Cl. X.R.

106—148, 176; 117—33.5 T; 252—117, 301.2 W, 543; 260—2 S, 37 EP, 37 NP, 77.5 A, 78 S, 141, 308 B